United States Patent [19]
Okada et al.

[11] Patent Number: 5,999,342
[45] Date of Patent: Dec. 7, 1999

[54] OBJECTIVE LENS DRIVING SYSTEM AND MANUFACTURING METHOD FOR SAME

[75] Inventors: Yukio Okada; Masaru Uno; Hisao Isobe, all of Nagano, Japan

[73] Assignee: Sankyo Seiki Mfg. Co., Ltd., Nagano-ken, Japan

[21] Appl. No.: 09/126,240

[22] Filed: Jul. 30, 1998

[30] Foreign Application Priority Data

Aug. 5, 1997 [JP] Japan ................................ 9-210401

[51] Int. Cl.⁶ ........................................................ G02B 7/02
[52] U.S. Cl. ............................ 359/813; 359/814; 359/824
[58] Field of Search ..................................... 359/813, 814, 359/823, 824; 369/44.14

[56] References Cited

U.S. PATENT DOCUMENTS 5,264,968 11/1993 Masunaga ................................ 359/824
5,789,720 8/1998 LaGally et al. ..................... 219/121.64
5,844,881 12/1998 Kasuga et al. ........................... 369/244

Primary Examiner—Georgia Epps
Assistant Examiner—Ricky Mack
Attorney, Agent, or Firm—McAulay Nissen Goldberg Kiel & Hand, LLP

[57] ABSTRACT

An objective lens driving system comprises a lens holder retaining an objective lens, a holder supporting member for movably supporting the lens holder in focusing and tracking directions, a magnetic driving circuit for moving the lens holder in the focusing and tracking directions, in which a flat driving coil made by winding a self-welding wire coated with a heat welding layer is face-bonded on either the lens holder or holder supporting member. The driving coil is configured such that the self-welding wire is united via the heat welding layer thereof and a surface thereof is coated with a reinforcing adhesive thinly. The reinforcing adhesive has a higher thermal stability than the heat welding layer.

8 Claims, 3 Drawing Sheets

OBJECTIVE LENS DRIVING SYSTEM AND MANUFACTURING METHOD FOR SAME

BACKGROUND OF THE INVENTION a) Field of the Invention

The present invention relates to an objective lens used for recording to and reproducing from optical recording disks such as CDs and DVDs and a manufacturing method thereof. More specifically, the present invention relates, in an objective lens driving system, to a technology in which driving coils of a magnetic driving circuit for correcting focusing errors and tracking errors of the objective lens are prevented from becoming detached.

b) Description of the Related Art

An optical pickup apparatus used for recording to and reproducing from optical recording disks such as CDs and DVDs employs an objective lens driving system that drives a lens holder retaining an objective lens in focusing and tracking error correcting directions on the holder supporting member by a magnetic driving circuit. In the magnetic driving circuit, permanent magnets are bonded on either the lens holder or holder supporting member, and driving coils are fixed by adhesive on the other member to face the permanent magnets. The driving coil is a flat coil made of a wound self-welding wire in which a heat welding layer is coated around a metallic wire. The self-welding wire is wound and then heated to melt the heat welding layer. With normal temperature, the wound self-welding wire is united with one another. Note that wiring of the driving coil is carried out such that the heat welding layer around the self-welding wire is melted with the heat for soldering to expose the metallic wire, and then the metallic wire is connected electrically. Therefore, a lower melting temperature for the heat welding layer facilitates soldering operation. Conventional technologies have used a self-welding wire whose melting temperature for the heat welding layer is about 140° C.

On the other hand, since the driving coil obtains heat at electrification, the heat welding layer of the self-welding wire is melted with such a heat. Therefore, there is a need to set the melting temperature of the heat welding layer high so that the self-welding wire will not be loosened and detach. Thus, two contradictory needs exist: a need for setting the melting temperature for the heat welding layer high against the heat by electrification of the driving coil, and a need for setting the same low to facilitate soldering operation. Conventionally, the facilitation of soldering has been considered more important, so the melting temperature of the heat welding layer is set low. With this, no problems occur while a normal degree current is applied to the driving coil; however, when an excessive current is applied to the driving coil, the heat welding layer will be melted, and thus the self-welding wire is loosened to detach.

OBJECT AND SUMMARY OF THE INVENTION

Considering the above problems, a primary object of the present invention is to provide an objective lens driving system in which a driving coil employs a self-welding wire whose melting temperature of a heat welding layer is low but the self-welding wire does not detach.

In accordance with the invention, an objective lens driving system comprises a lens holder retaining an objective lens, a holder supporting member for movably supporting the lens holder in focusing and tracking directions, a magnetic driving circuit for moving the lens holder in the focusing and tracking directions, in which a flat driving coil made by winding a self-welding wire coated with a heat welding layer is face-bonded on either the lens holder or holder supporting member. The driving coil is configured such that the self-welding wire is united via the heat welding layer thereof and a surface thereof is coated with a reinforcing adhesive thinly. The reinforcing adhesive has a higher thermal stability than the heat welding layer.

DESCRIPTION OF THE PREFERRED EMBODIMENTS

Figure 1:
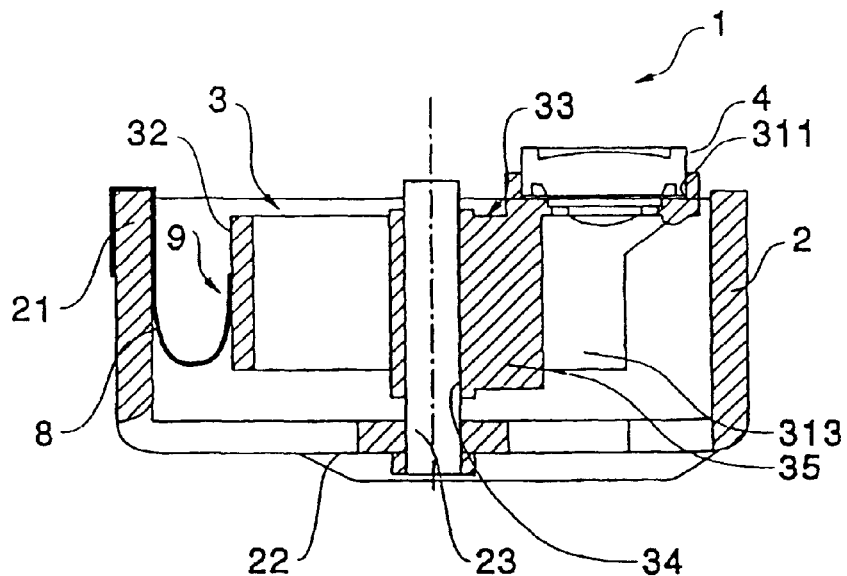
FIG. 1 is a cross sectional view showing a simple construction of an objective lens driving system to which the present invention is applied.

A preferred embodiment of an objective lens driving system of the present invention will be described referring to the drawings.

Figure 2:
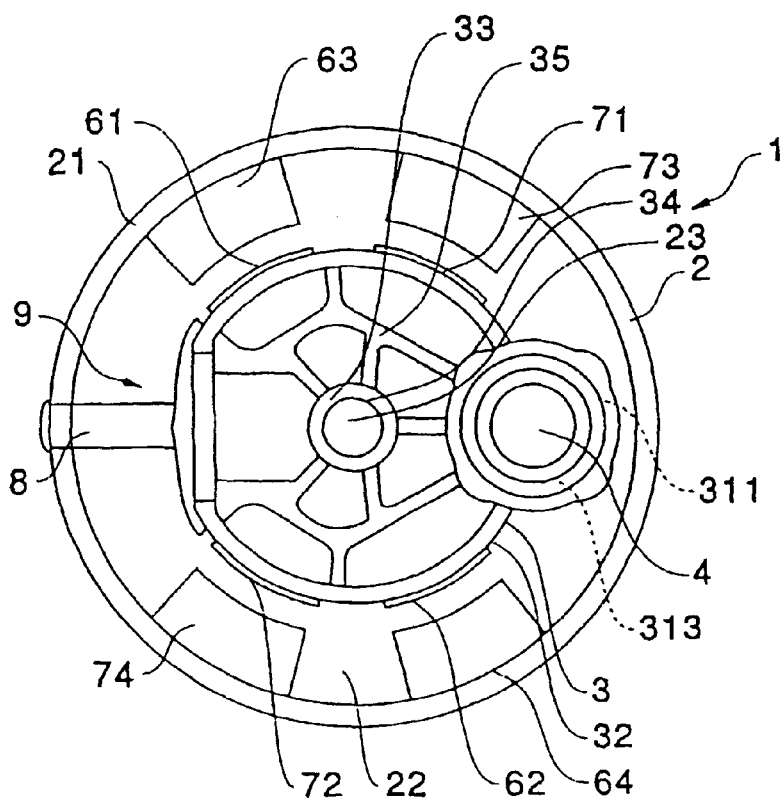
FIG. 2 is a plan view of the objective lens of FIG. 1.

FIGS. 1 and 2 respectively show cross-sectional view and plan view of an objective lens driving system of an optical pickup in which the present invention is applied. The optical pickup of this embodiment is used for reproducing from CDs or/and DVDs which are optical recording media.

As shown in these figures, objective lens driving system 1 comprises a metallic frame (a holder supporting member/yoke) 2 and a plastic lens holder 3 installed on the inner side of the frame 2. The frame 2 has a cylindrical circumferential wall portion 21 and a bottom plate portion 22, in the center of which a shaft 23 stands uprightly.

The lens holder 3 is constructed with a cylindrical inner circumferential wall portion 33 that extends upright in the center thereof and a cylindrical outer circumferential wall portion 32 which is connected to the inner circumferential wall portion 33 via a rib 35. A hollow portion on the inner side of the inner circumferential wall portion 33 is a shaft through hole 34 through which the shaft 23 passes. With the shaft 23 passing through the through hole 34, the lens holder 3 is rotatable around the shaft 23 and also slidable in the axial direction of the shaft 23. A lens mounting hole 311 is formed at the top end portion of the lens holder 3, in which an objective lens 4 is mounted. The lens mounting hole 311 is communicated with an optical path which is parallel to the shaft through hole 34.

Installed between the frame 2 and lens holder 3 are a tracking driving mechanism for moving the objective lens 4 mounted on the lens holder 3 in the tracking direction and a focusing driving mechanism for moving the objective lens 4 in the focusing direction, both of which are of magnetically driven type. For example, the tracking driving mechanism includes driving coils for tracking 61 and 62 attached on the outer surface of the outer circumferential wall portion 32 of the lens holder 3 by an angular interval of 180° and driving coils for focusing 71 and 72 attached at positions on the same outer surface rotated by a predetermined angle with respect to the driving coils 61 and 62. These driving coils 61, 62, 71, and 72 are wound in the air and shaped in arc following the outer surface of the lens holder 3. Provided on the inner surface of the outer circumferential wall portion 21 of the frame 2 are permanent magnets for tracking 63 and 64 facing the driving coils for tracking 61 and 62 and permanent magnets for focusing 73 and 74 facing the driving coils for focusing 71 and 72. By controlling the current supply to the driving coils 61, 62, 71, and 72, a magnetic force is generated between each driving coil 61, 62, 71, 72 and the corresponding permanent magnet 63, 64, 73, 74. With the magnetic force, the lens holder 3 can be rotated around the shaft 23 within a predetermined angular range for tracking error correction, and the lens holder 3 can be slid in the axial direction of the shaft 23 for focusing error correction.

Figure 3:
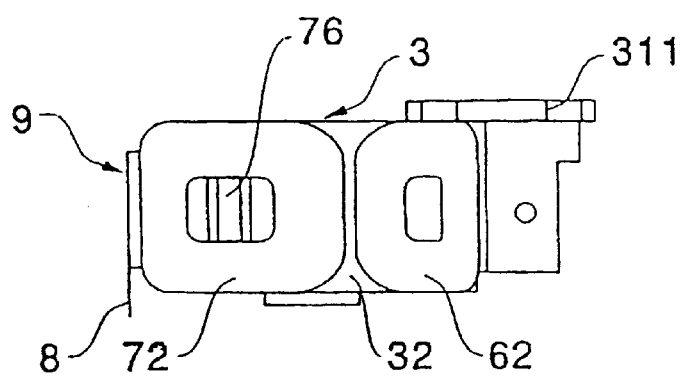
FIG. 3 is a side view of a lens holder used in the objective lens driving system of FIG. 1.

Note that, as shown by a side view of the lens holder 3 illustrated in FIG. 3, a magnetic piece 76 is attached on the inner side of each of the driving coils for focusing 71 and 72. The lens holder 3 is retained at a predetermined mid-point using a magnetic repulsion generated between the magnetic pieces 76 and permanent magnets for focusing 73, 74.

As understood from FIGS. 1 and 2, a flexible printed board 8 is placed between the lens holder 3 and frame 2 to supply current to each of the driving coils 61, 62, 71, and 72 mounted on the lens holder 3.

Figure 4:
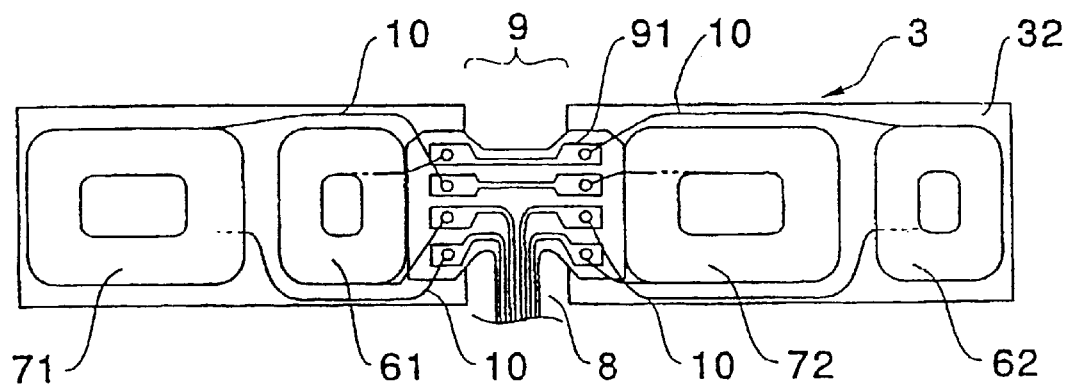
FIG. 4 shows how a driving coil is mounted on the outer surface of the lens holder used in the objective lens driving system of FIG. 1.

FIG. 4 shows an expanded outer surface of the lens holder 3 to illustrate the arrangement of the driving coils 61, 62, 71, and 72 on the outer surface of the lens holder 3.

FIG. 4 shows the flexible printed board 8 in which a wiring pattern is printed with copper foil and the like on the surface of a flexible board, for example. The flexible printed board 8 has a wire connecting section 9 having multiple terminals 91 on the lens holder 3. At the wire connecting section 9, the self-welding wire 10 drawn from each of the driving coils 61, 62, 71, and 72 is connected to each terminal 91.

Figure 5:
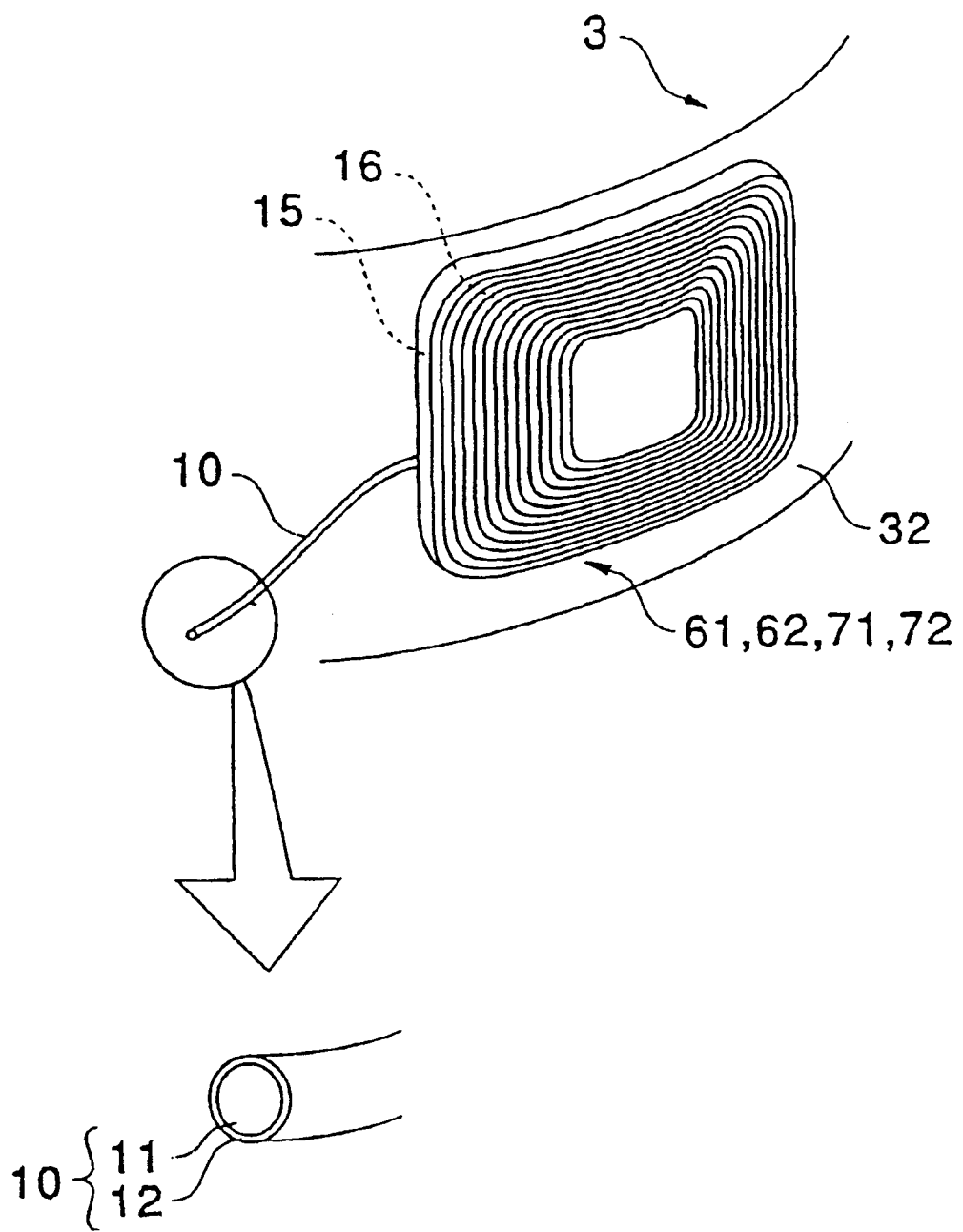
FIG. 5 shows a construction of the driving coil used in the objective lens driving system of FIG. 1.

FIG. 5 shows the driving coils 61, 62, 71, and 72 in which the self-welding wire 10 made of a metallic wire 11 such as a copper wire coated with the thermoplastic heat welding layer 12 is wound in the air and flat. When the self-welding wire 10 drawn from each of the driving coil 61, 62, 71, and 72 is connected to each terminal 91, a soldering iron is applied to the self-welding wire 10 to melt the heat welding layer 12 with the heat thereof so that the metallic wire 11 is exposed. In order to perform such a soldering efficiently, this embodiment employs the self-welding wire 10 in which the melting temperature of the heat welding layer 12 is about 140° C.

In the driving coils 61, 62, 71, and 72, as the heat welding layer 12 is melted by the heat added during the manufacture of the driving coils 61, 62, 71, and 73 and then returned to a normal temperature, it is cured so that the wound self-welding wire 10 is united. Under the condition that the wound self-welding wire 10 is united, the driving coils 61, 62, 71, and 72 are face-bonded along the arc shape of the outer circumferential wall portion 32 of the lens holder 3 with a fixing adhesive 15. Then, on the surfaces of the driving coils 61, 62, 71, and 72 face-bonded along the outer circumferential wall portion 32 of the lens holder 3, a thermosetting reinforcing adhesive 16 whose decomposing temperature is higher than a softening temperature of the heat welding layer 12 is coated. The reinforcing adhesive 16 is coated extremely thin. Specifically, the size of the self-welding wire used for the driving coil is normally about 0.06 mm–0.14 mm of diameter; the reinforcing adhesive 16 is coated as thin as the recess-protrusion feature formed by the self-welding wire 10 on the driving coil surface can be still shown. Bisphenol type epoxy resin adhesive, for example, can be used for the reinforcing adhesive 16.

In the objective lens driving system 1 configured in the above manner, the thermosetting reinforcing adhesive 16 whose decomposing temperature is high is coated extremely thin over the surface of the driving coils 61, 62, 71, and 72 face-bonded to the lens holder 3. Therefore, even if excessive current is applied to the driving coils 61, 62, 71, and 72 to heat them excessively and melt the heat welding layer 12, the self-welding wire 10 will not be loosened to detach. In addition, as such a heating stops and the temperature of the heat welding layer 12 decreases, the heat welding layer 12 is cured to again unite the self-welding wire 10 with one another. In this manner, according to this embodiment, even when abnormal heating occurs on the driving coils 61, 62, 71, and 72 which use the self-welding wire 10 having the heat welding layer 12 of low melting temperature, the self-welding wire 10 will not be loosened to detach. Also, although the surface of the driving coils 61, 62, 71, and 72 is coated with the reinforcing adhesive 16, the coating of the reinforcing adhesive 16 is very thin; therefore, there is no need to change the gap dimension between the driving coils 61, 62, 71, and 72 and the facing permanent magnets 63, 64, 73, and 74. Further, the thinly coated reinforcing adhesive 16 does not prevent the driving coils 61, 62, 71, and 72 from releasing heat. Thus, the structure in which the reinforcing adhesive 16 is thinly coated over the surface of the driving coils 61, 62, 71, and 72 is suitable as a reinforcing structure for the driving coils 61, 62, 71, and 72 in the objective lens driving system 1.

In the manufacturing process of the objective lens driving system 1 of this embodiment, the following method is employed for mounting the driving coils 61, 62, 71, and 72 in the lens holder 3 using such a structure.

Each of the driving coils 61, 62, 71, and 72 in which the wound self-welding wire 10 is united via the heat welding layer 12 is first face-bonded on the outer surface of the outer circumferential wall portion 32 of the lens holder 3 with the fixing adhesive 15. Next, on the surface of the driving coils 61, 62, 71, and 72, the reinforcing adhesive 16 which is diluted with a solvent such as a thinner by 20 times, for example, is applied. Then, the solvent is removed and the reinforcing adhesive 16 is cured. When the reinforcing adhesive 16 is of an UV curable resin, UV is irradiated for cure; when the reinforcing adhesive 16 is of a solvent drying type, the solvent will be evaporated and cured as time passes. After the driving coils 61, 62, 71, and 72 are fixed along the outer surface of the outer circumferential wall portion 32 of the lens holder 3 in this manner, the objective lens driving system 1 is assembled.

With the above method, only by defining the dilution with the solvent for the reinforcing adhesive 16, the surface of the driving coils 61, 62, 71, and 72 can be coated with the thin reinforcing adhesive 16.

Note that, although the driving coils 61, 62, 71, and 72 are fixed on the lens holder 3 in this embodiment, they may be fixed on the frame 2 and the permanent magnets on the lens holder 3.

Also, the present invention can be applied to a structure in which a single objective lens 4 for CDs or DVDs is supported on the lens holder 3 as well as a structure in which two objective lenses for CDs and DVDs are supported in a single lens holder 3 and used by switching thereof.

Furthermore, "high thermal stability" in the present invention means that when the reinforcing adhesive is one of thermoplastic the melting temperature thereof is higher than that of the heat welding layer. On the other hand, when the reinforcing adhesive is one of thermosetting, the decomposing temperature thereof is higher than the melting temperature of the heat welding layer.

In the present invention, a thermoplastic adhesive may be used as the reinforcing adhesive as long as the thermal stability thereof is higher than the heat welding layer. In this case, the thermoplastic adhesive should be one having a higher melting temperature than the heat welding layer.

As described above, the optical pickup apparatus of this embodiment is featured in that the flat driving coil in which the self-welding wire thereof is united via the heat welding layer is first face-bonded to the lens holder and the like, and the surface of the driving coil is thinly coated with an adhesive of a high thermal stability, such as the thermosetting reinforcing adhesive whose decomposing temperature is higher than a softening temperature of the heat welding layer. In the present invention, even if the driving coil is heated to melt the heat welding layer, the self-welding wire will not be loosened due to the reinforcing adhesive. Also, as the heating stops and the temperature of the heat welding layer decreases, the self-welding wire is again united via the heat welding layer. Therefore, even when the driving coil in which a self-welding wire having a heat welding layer of a low melting temperature is employed for a facilitated soldering is heated, the self-welding wire will not detach. Although the driving coil surface is coated with the reinforcing adhesive, the coating remains thin; therefore, there is no need to change the gap between the driving coil and the opposite permanent magnet, and this structure does not prevent the driving coil from releasing heat. Thus, the present invention is suitable for a reinforcing structure for the driving coil in the objective lens driving system.

While the foregoing description and drawings represent the preferred embodiments of the present invention, it will be obvious to those skilled in the art that various changes and modifications may be made therein without departing from the true spirit and scope of the present invention.

What is claimed is:

1. An objective lens driving system comprising:

a lens holder retaining an objective lens;

a holder supporting member for movably supporting said lens holder in focusing and tracking directions; and a magnetic driving circuit for moving said lens holder in said focusing and tracking directions, in which a flat driving coil made by winding a self-welding wire coated with a heat welding layer is face-bonded on one of said lens holder and holder supporting member;

said driving coil being configured such that said self-welding wire is united via said heat welding layer thereof, and a surface thereof being coated with a reinforcing adhesive thinly, said reinforcing adhesive having a higher thermal stability than said heat welding layer.

2. The objective lens driving system as set forth in claim 1 wherein said reinforcing adhesive is a thermosetting adhesive whose decomposing temperature is higher than a melting temperature of said heat welding layer.

3. The objective lens driving system as set forth in claim 1 wherein said reinforcing adhesive is a thermoplastic adhesive whose melting temperature is higher than that of said heat welding layer.

4. The objective lens driving system as set forth in claim 1 wherein said reinforcing adhesive is coated as thin as a recess-protrusion feature formed by said self-welding wire shows through a surface thereof.

5. The objective lens driving system as set forth in claim 1 wherein said driving coil is wound in the air.

6. The objective lens driving system as set forth in claim 1 wherein said driving coil is face-bonded to an outer circumferential surface of said lens holder following an arc-shaped outer surface of said lens holder.

7. The objective lens driving system as set forth in claim 1 wherein an epoxy resin type adhesive is used for said reinforcing adhesive.

8. A method of manufacturing an objective lens driving system that comprises a lens holder retaining an objective lens, a holder supporting member for movably supporting said lens holder in focusing and tracking directions, and a magnetic driving circuit for moving said lens holder in said focusing and tracking directions, in which a flat driving coil made by winding a self-welding wire coated with a heat welding layer coated is face-bonded on either said lens holder or said holder supporting member, said method comprising the steps of:

first bonding said driving coil in which said self-welding wire is united via said heat welding layer thereof on either said lens holder or holder supporting member; and then applying said reinforcing adhesive having a higher thermal stability than said heat welding layer on a surface of said driving coil and curing.

\* \* \* \* \*